United States Patent
Häggman

(10) Patent No.: US 6,558,305 B1
(45) Date of Patent: May 6, 2003

(54) APPARATUS THAT CLAMPS AN END MEMBER TO A CASING

(75) Inventor: Jaako Häggman, Helsinki (FI)

(73) Assignee: UPM-Kymmene Corporation, Helsinki (FI)

(*) Notice: Subject to any disclaimer, the term of this patent is extended or adjusted under 35 U.S.C. 154(b) by 138 days.

(21) Appl. No.: 09/716,638

(22) Filed: Nov. 20, 2000

Related U.S. Application Data

(63) Continuation of application No. PCT/FI99/00403, filed on May 12, 1999.

(51) Int. Cl.⁷ .................................................. B31B 1/90
(52) U.S. Cl. ..................... 493/105; 493/107; 493/109; 493/156; 493/158
(58) Field of Search ................................ 493/109, 107, 493/155, 156, 158, 105

(56) References Cited

U.S. PATENT DOCUMENTS

| | | | |
|---|---|---|---|
| 2,912,282 A | 11/1959 | Shult | |
| 3,049,979 A | 8/1962 | Sayford | |
| 3,468,226 A | 9/1969 | England et al. | |
| 3,579,958 A | 5/1971 | Pearson | |
| 3,589,094 A | 6/1971 | Hentges et al. | |
| 3,668,824 A | 6/1972 | Solomonov et al. | |
| 3,764,425 A | 10/1973 | Neff et al. | |
| 3,918,236 A | 11/1975 | Allen | |
| 3,962,844 A | 6/1976 | Gordon | |
| 3,964,237 A | 6/1976 | Johansen | |
| 4,100,842 A | 7/1978 | Richards et al. | |
| 4,127,059 A | * 11/1978 | Richards | |

(List continued on next page.)

FOREIGN PATENT DOCUMENTS

| | | |
|---|---|---|
| CH | 642 315 | 4/1984 |
| CH | 676217 | 6/1988 |
| DE | 413236 | 5/1925 |
| EP | 38488 | 10/1981 |
| EP | 131101 | 1/1985 |
| EP | 417864 | 3/1991 |
| EP | 441181 | 8/1991 |
| GB | 374301 | 6/1932 |
| GB | 1357708 | 10/1973 |
| GB | 1373088 | 11/1974 |
| GB | 2103538 | 2/1983 |
| SE | 451 252 | 9/1981 |
| WO | WO 8703536 | 6/1987 |
| WO | WO 9631406 | 10/1996 |

OTHER PUBLICATIONS

Copy of Finish Search Report.
Search Report from PCT/FI99/00403.

*Primary Examiner*—Eugene Kim
(74) *Attorney, Agent, or Firm*—Fitch, Even, Tabin & Flannery

(57) ABSTRACT

A container-forming apparatus comprising a movable mandrel supporting the casing and the end member, which closes the open end of the casing and an end sealing station comprising a clamping means in order to press together the edge of the casing, said casing being transferred to the end sealing station by the mandrel, and the edge of the end member, said edge being turned longitudinally towards the casing. The clamping means comprises a piston moving back and forth in the longitudinal direction of the casing, said piston having pushing surfaces approaching the sliding axle in the pushing direction causing the clamping action. The pushing surfaces are the countersurfaces of the clamping members, said clamping members being arranged to turn towards the frame of the clamping means. The countersurfaces form the front portion of the piston, said front portion tapering into a V-shape in the pushing direction in order to turn the clamping surfaces of the clamping members outwards towards the clamping countersurfaces positioned on the frame of the clamping means.

16 Claims, 4 Drawing Sheets

U.S. PATENT DOCUMENTS

| | | |
|---|---|---|
| 4,135,347 A | 1/1979 | Lowdermilk |
| 4,228,633 A | 10/1980 | Corbic |
| 4,250,798 A | 2/1981 | Yamato et al. |
| 4,285,750 A | 8/1981 | DeMartino |
| 4,317,323 A | 3/1982 | Richards et al. |
| 4,334,875 A | 6/1982 | Eckert |
| 4,409,045 A * | 10/1983 | Busse |
| 4,490,130 A | 12/1984 | Konzal et al. |
| 4,544,431 A | 10/1985 | King |
| 4,559,765 A | 12/1985 | Cress et al. |
| 4,581,003 A | 4/1986 | Ito et al. |
| 4,680,016 A | 7/1987 | Lynch |
| 4,718,961 A | 1/1988 | Yamato et al. |
| 4,726,210 A | 2/1988 | Weil et al. |
| 4,757,912 A | 7/1988 | Heyting |
| 5,026,338 A * | 6/1991 | Blackwelder et al. |
| 5,035,106 A | 7/1991 | Haase |
| 5,069,021 A | 12/1991 | Reil et al. |
| 5,120,292 A | 6/1992 | Ueda et al. |
| 5,135,462 A | 8/1992 | Stahlecker et al. |
| 5,188,253 A | 2/1993 | Poore et al. |
| 5,324,249 A | 6/1994 | Konzal |
| 5,451,301 A | 9/1995 | Voracek |
| 5,473,860 A | 12/1995 | Linner |
| 5,752,907 A | 5/1998 | Konzal |
| 5,871,430 A * | 2/1999 | Mueller |
| 5,910,228 A | 6/1999 | Atkinson et al. |
| 5,913,798 A | 6/1999 | Grabher |

* cited by examiner

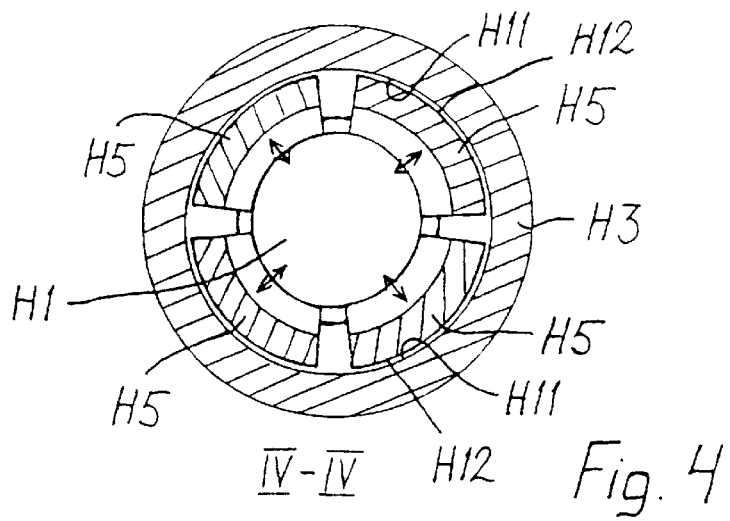
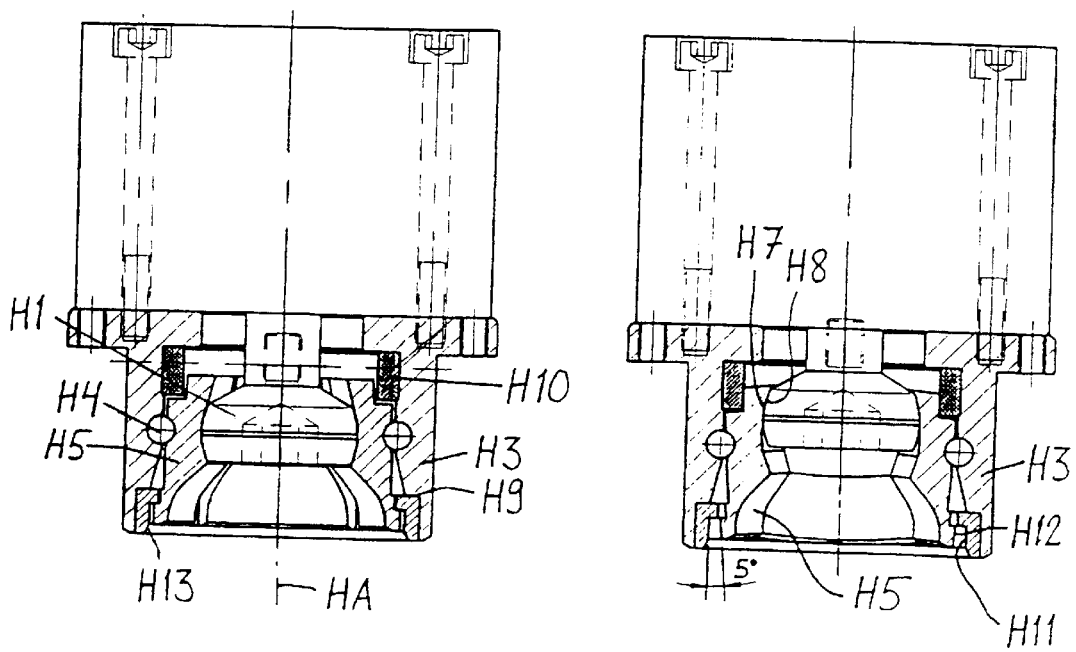

APPARATUS THAT CLAMPS AN END MEMBER TO A CASING

This is a continuation of PCT/FI99/00403, filed May 12, 1999.

The object of the invention is a container-forming apparatus, which is of the type presented in the preamble of patent claim 1.

The invention particularly relates to the kind of container-forming apparatuses which produce horizontally circular cylindrical containers, in which at least one of the end members closing the container is sealed into the open end of the cylindrical casing by pressing the edges of the portions together. In practice, this is done in such a way that the end member, the outer edges of which are turned in the axial direction of the casing, is positioned inside the casing, after which the edge portion of the casing is folded double so that it is wrapped over the outwardly turned edge of the end member, after which pressure is applied in order to create the final seal. Prior to these mechanical stages the end member and the upper end of the casing are heated by air blowing, so that the heat-sealable substances on the surface of the above-mentioned portions are brought to a suitable condition.

These known container-forming stages are described, for example, in European patents 0 038 488 and 0 456 011.

The clamping means used in presently known container-forming units usually have a heavy and complex structure and, in addition, they cannot obtain sufficient clamping efficiency, which has a decisive effect on the tightness of the seal. The object of the invention is to introduce an improvement to the above-mentioned prior art and to present a container-forming apparatus, in which the clamping means is structurally easy to realise, and the said clamping means gives a good clamping effect that can advantageously be applied to the entire perimeter of the bottom portion of the casing and the end member. In order to implement this the container-forming apparatus according to the invention is mainly characterised by what is presented in the characterising part of the attached patent claim 1. The clamping means comprises a piston with a V-shaped front portion, which pushes the clamping members radially outwards, said clamping members being pivotally mounted to turn towards the frame, whereby the folded bottom portion of the casing wrapped around the edge of the end member is pressed between the outer surfaces of the clamping members and the clamping countersurfaces positioned outermost on the frame of the clamping means. As the clamping members are mounted on bearings to turn towards the frame, said clamping members form levers, by means of which a good force effect is obtained.

Other preferred embodiments are referred to in the attached dependent patent claims and the subsequent description.

The invention is described in more detail with reference to the accompanying drawings, wherein FIG. 1 shows a longitudinal cross-section of the can forming a part of the container.

FIG. 4 shows the clamping means used in the apparatus in a cross-section along the line IV—IV.

FIG. 5 shows a cross-section of another embodiment of the clamping means used in the apparatus.

FIG. 6 shows the embodiment presented in FIG. 5 in another position.

The following terms are used in describing the different portions of the liquid container:

container: sales package or casing depending on the context.

sales package: a finished, filled and sealed liquid container.

casing: unfilled and unsealed outer casing of the sales package.

can: a container, which is characterised by a portion, i.e. a casing, which is wrapped to form a structure that is closed in the cross-section perpendicular to the longitudinal axis, one or both ends of said casing being closed with an end member.

sidewall blank: a straight, flat member usually made of liquid packaging board, which by joining together can be formed into a casing, and which can be separated from a material having a larger area, such as a long strip.

the outer surface of the sidewall blank or the blank material: a surface that forms the outer surface of the finished container, usually bearing the printing and having a heat-sealable coating.

the inner surface of the sidewall blank or the blank material: a surface that in a finished container forms the surface which is in contact with the product to be packed, said surface usually having a heat-sealable coating.

sidewall blank material: the raw material of sidewall blanks, usually liquid packaging board covered with a heat-sealable coating.

Figure 1:
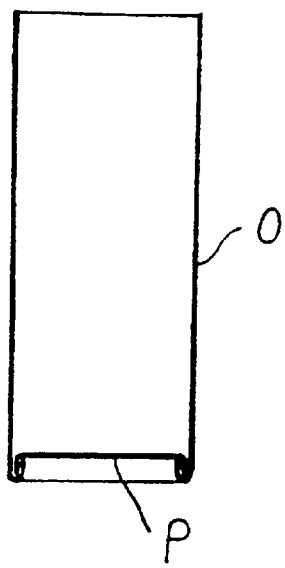

The packaging machine comprises a container-forming unit, where the vertical portion of the can-shaped container presented in FIG. 1, i.e. casing O having a closed shape, is formed, after which the end member P closing the open end of the casing O is joined to the casing O. This can-shaped container, one end of which is still open, is transferred to the filling unit of the packaging machine where the final sales package is formed, and which is not described here in greater detail.

Figure 2:
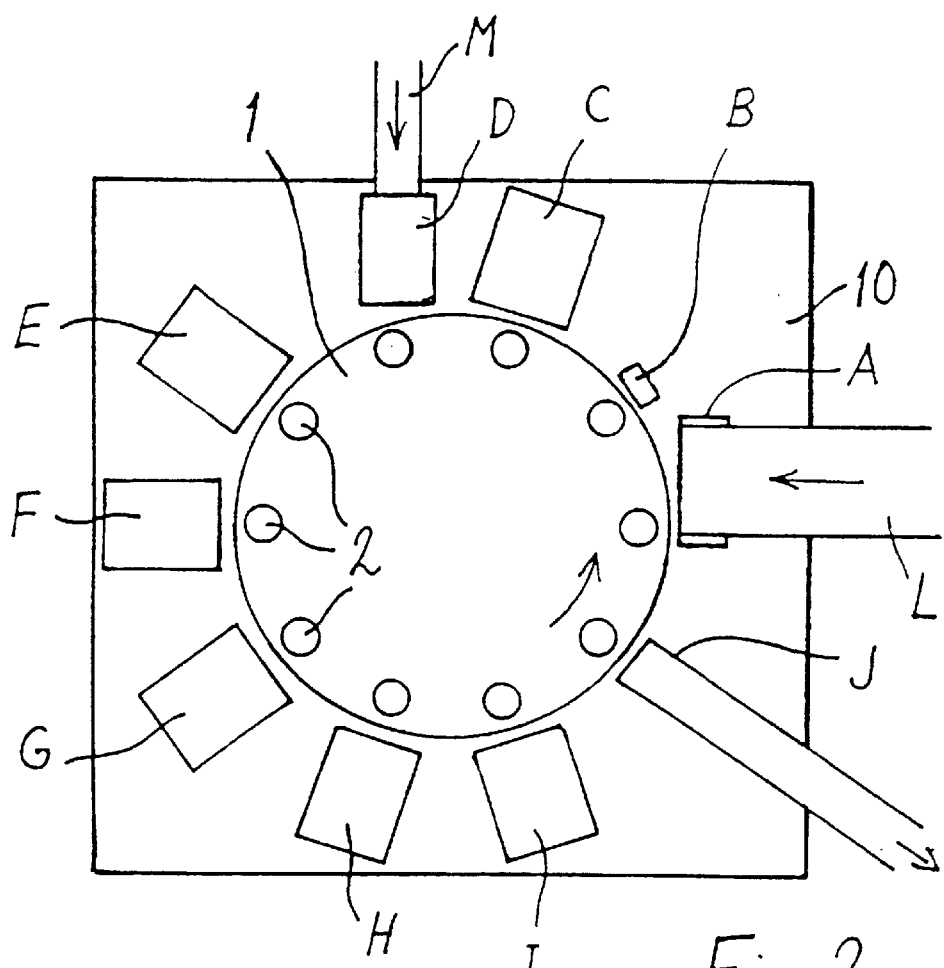
FIG. 2 shows the container-forming unit in which a container-forming apparatus according to the invention is used, seen from above.

In the container-forming unit presented in FIG. 2 there is a horizontally rotating transfer table 1, on the perimeter of which there are shaping tools at fixed angular distances, said shaping tools supporting the afore-mentioned container at different forming stages. The shaping tools are identical and each consisting of a vertical mandrel 2, around which the casing is formed, said mandrel being later referred to as the wrapping mandrel.

In addition to the transfer table 1, the container-forming unit comprises a fixed frame, on which the transfer table is arranged so as to rotate, said frame being generally designated by the reference number 10. The frame comprises processing stations, equalling the number of wrapping mandrels 2, and a certain forming stage of a can open at one end is carried out at each station. At the stop stage, during which the processing stations perform certain operations, the mandrels are positioned at the processing stations and during the transfer stage said mandrels are transferred by a short rotational movement of the table equalling in length the distance between the wrapping mandrels 2, to the following station for next processing stage.

The processing stations are now described in greater detail mainly on the basis of their function in forming a can-like casing. In every station there are parts attached to the frame 10, which by their motion or other action bring about the desired operational stages. The moving parts are positioned on the frame, mainly on the outside of the circular track of the wrapping mandrels and/or above the mandrels or said moving parts are arranged in such a way that they are temporarily on the track of the mandrels and move out of the way for the mandrels for the duration of the transfer stage. These different parts are not described in detail in FIG. 2, which only shows the supporting structures of the various stations to which the afore-mentioned functional parts are attached.

At wrapping station A, a sidewall blank of a certain height is cut off from the lower end of the blank web, said blank web being transferred to the station with the help of transfer devices positioned on the frame, after which the sidewall blank is pushed onto the wrapping mandrel 2 and wrapped around it into a shape determined by the outer surface of the mandrel. This is how the can-like casing is formed, which in horizontal section has a closed form, in the case of cylindrical mandrels a circular form.

At sidewall sealing station B, the overlapping sidewall edges of the sidewall blank are permanently sealed together. This is performed with the help of a clamping surface, which presses the overlapping edges together and at the same time causes the cooling of the heat seal coating on the inner surface of the sidewall blank, said coating having been previously heated to a bonding temperature.

At the preheating station C, hot air is blown inside the side-sealed portion towards its top end, causing the heat seal coating on the inner surface of the sidewall blank material to heat up sufficiently.

At the end member station D, the end members, whose outlines correspond in shape to the horizontal section of the casing, are separated by die cutting from a continuous blank web M fed into the station, after which said end member is forced through a hole, causing the outer edges of the end member to bend. At the following stage the end member is pushed down onto the open upper end of the casing by using the top surface of the wrapping mandrel as a countersurface In such a way that the upward folded outer edges of the end member are pressed against the inner surface of the casing.

At the first heating station E, hot air is blown onto the outer surface of the end member directing the air to the edges, thereby heating the lower surface of the member at the folded edge turned up towards the inner surface of the upper end of the casing.

At the other heating station F, the same process is carried out in order to ensure sufficient heating around the entire perimeter of the upper end.

At the clenching station G, the upper edge of the casing that is above the upward folded ege of the end member, is turned by pressing it from above towards the centre and down, whereby the upper edge of the casing is folded over the upward folded outer edge of the end member.

At the first end sealing station H, the edge portion of the casing is pressed against the upward folded edge of the end member, whereby the previously heated heat-seal coatings bond the members together, and the upward folded outer edge of the end member remains permanently sealed inside the U-folded upper edge.

At the second end sealing station I, the same operational stages are performed at different points than in the previous station so that the seal will be even around the entire perimeter of the already finished can-like casing.

At the last processing station, i.e. the discharge station, the can-like casing is lifted off the wrapping mandrel 2 and transferred along the conveyor track to the filling unit of the packaging machine.

When a finished can is removed from the wrapping mandrel 2, said mandrel is transferred by a short rotational movement of table 1 to the wrapping station A to receive a new sidewall blank, and the afore-mentioned processing stages are repeated.

A typical processing time at each of the stations A–J is about 500 ms including the transfer from one station to another. Consequently, the can is finished in the container-forming unit in about five seconds, and the production capacity is one can per 0.5 seconds, i.e. about 120 cans per minute.

Figure 3:
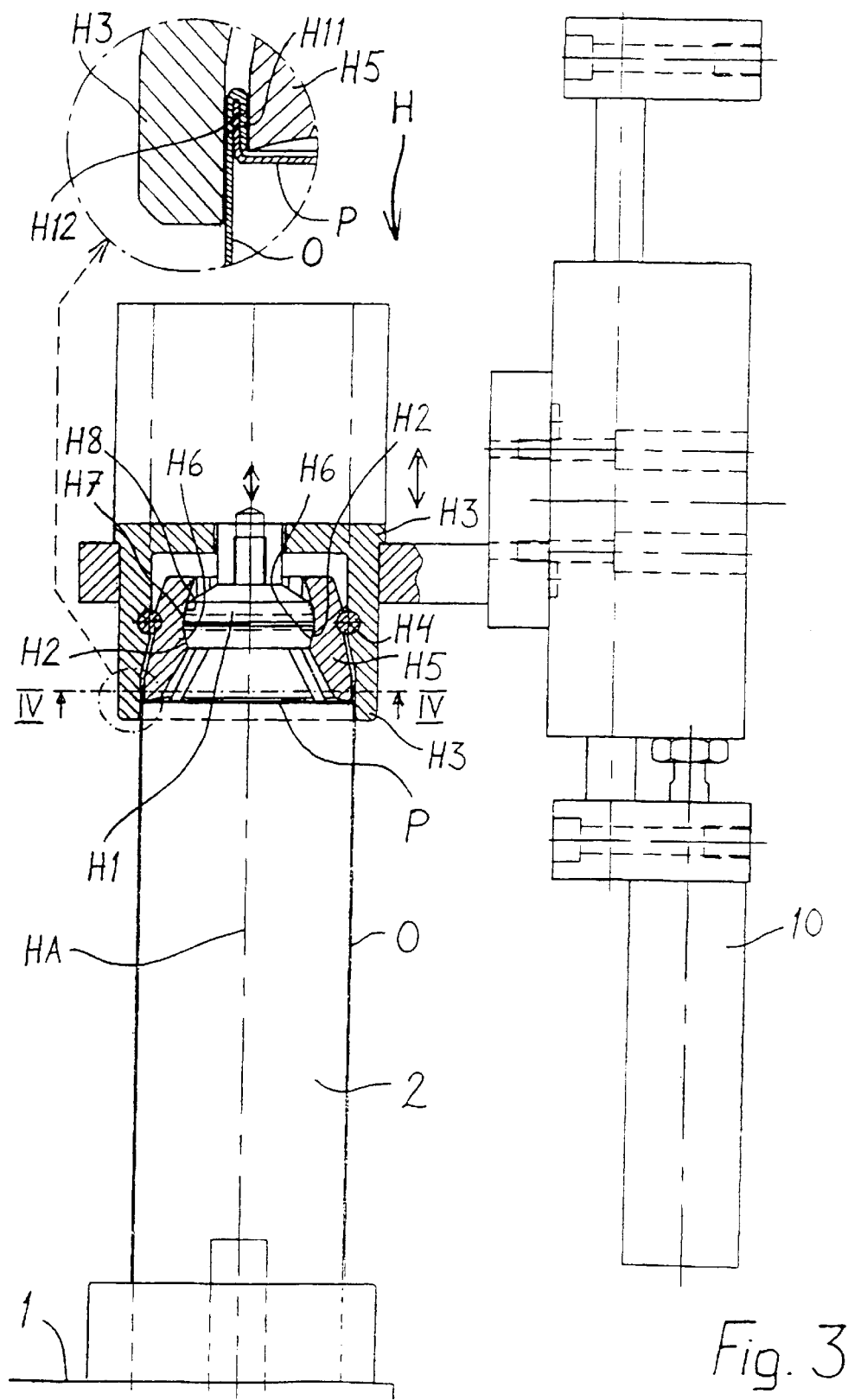
FIG. 3 shows the container-forming apparatus, seen from the side.

FIG. 3 presents a container-forming apparatus according to the invention. Said apparatus comprises a wrapping mandrel 2, which is used for forming a container, said mandrel being transferred between different processing stations in the afore-described manner. The surface of the mandrel supports the casing O, which is wrapped around the mandrel to conform to the shape of said mandrel, and the end of the mandrel, being perpendicular to the casing, supports the end member P at the top, which end member is partly positioned inside the casing, the edges of said end member being folded outwards in an axial direction to the casing O towards the outer edge of said casing. FIG. 3 presents a situation in which the outer edge of the casing is folded into a U-shape in such a way that the folded edge of the end member P remains inside the end fold, i.e. a can shaped like the one presented in FIG. 1 is formed during this stage.

In addition, the container-forming apparatus comprises an end sealing station H, which has a clamping means that moves back and forth in an axial direction to the wrapping mandrel 2. The mandrels 2 are positioned on a supporting base plate in an upright position, such as on the afore-described transfer table 1, and the clamping means is arranged with the help of an actuator to move upwards to a position where said clamping means does not prevent the movement of the mandrels down and to operational position in such a way that the clamping means comes into contact with the end member of the can supported by the mandrel. As the previous description shows, the motions have to be rapid, as the processing time at different stations is less than one second.

The clamping means incorporates a piston H1, which is arranged to move by its own actuator in a longitudinal direction to the casing, i.e. in axial direction to the mandrel. On the front portion of the piston, i.e. at the end closest to the mandrel, there is a pushing surface H2 approaching in the outward pushing direction of the piston to the sliding axis HA (central axis of the piston) and the longitudinal axis of the mandrel joining it, said pushing surface H2 being in contact with the radially outermost countersurface H6, and likewise approaching the central axis HA in clamping member H5. Said clamping member H5 is arranged to pivot around a transverse axle H4 against the pushing direction, whereby the outermost surface of the clamping member H5 seen in radial direction, forms a clamping surface H12. As the piston is pushed towards the mandrel 2, the clamping member H5 is turned outwards in the pushing direction in the area in front of the axle H4, whereby in this area the clamping surface at the end of the clamping member is moved towards the opposing, fixed clamping countersurface H11 positioned on the frame of the clamping means. The clamping member H5 and the frame of the clamping means H3 form clamping jaws, and the above-described end fold of the casing O together with the folded edge of the end member P remaining inside this fold are pressed between these clamping jaws, more accurately between clamping surfaces H12 and the clamping countersurface H13.

Above is described the function of the clamping member H5. However, the clamping means incorporates several clamping members H5 arranged radially around the sliding axis HA, each of said clamping members having a similar structure and functioning in the same manner as that described above. All of the clamping members are therefore moved by the same piston H1, the pushing surfaces H2 of said piston forming the front portion of the piston, said front portion tapering into a V- or cone-shape in the pushing direction. Correspondingly, the clamping members H5 form an opening narrowing in a similar fashion in the pushing direction around the front portion of the piston, into which the front portion of said piston H1 fits.

FIG. 3 further shows how the axles H4 of clamping members H5 are positioned in the pushing direction before the pushing surface H2 and the corresponding countersurface H6. First, the frontmost ends of the clamping members H5 are rapidly turned outwards by the force of the centrally located piston H1, i.e. said ends move rapidly to the operational position, after which the clamping force increases as the piston is pushed forward. The axles H4 are positioned in grooves at the corresponding cylindrical midlines of the clamping members. Said axles H4 are positioned between the clamping members H5 and the frame H3 of the clamping means in such a way that on the outer surface of the clamping member H5 and on the inner surface of the frame H3 there is a groove curving perpendicular to the axle, which grooves together form a space into which the axle H4 fits.

The clamping countersurfaces H11 on the frame H3 are arranged around the inner surface surrounding the clamping members opposite to the corresponding clamping surfaces H12 of the clamping members H5. This inner surface is naturally formed to corresponding in shape to the end of the casing, i.e. in the case of cylindrical containers it is circular. In this case the clamping surfaces are correspondingly circular in cross-section perpendicular to the pushing direction. This is shown in FIG. 4, which also indicates that there are four of the clamping members H5, i.e. the clamping directions are at angles of 90°, but there may be another sufficient number of the clamping members H5. From the point of view of durability and clamping efficiency, the frame of the clamping means, the clamping members and the piston are most preferably manufactured of some metal suitable for the purpose, including alloys.

FIG. 3 further shows that the piston H1 incorporates a rear portion, said rear portion tapering into a V-shape in the direction opposite to the pushing direction—i.e. in the pulling direction—and being formed by pulling surfaces H7 approaching the sliding axle in this direction. These pulling surfaces are in contact with the countersurfaces H8 of the clamping members, said countersurfaces correspondingly approaching the sliding axle. This means that the clamping surfaces H12 of the clamping members H5 can be moved away from the equivalent countersurfaces H11, i.e. the clamping jaws are opened by pulling the piston H1 backwards, whereby the end of the casing can be released from clamping and the clamping means can be moved away from the mandrel when the clamping stage is over. This is also the position of clamping members when the clamping means is again moved to the operational position into contact with the end of the casing and the end member.

The cycle of operations performed at the work station includes the following successive stages:

transfer of the clamping means with clamping jaws open into contact with the end of the casing closing of the clamping jaws in order to press the skirt of the casing between the clamping jaws opening of the clamping jaws moving of the clamping means with the clamping jaws open, away from the end of the casing FIG. 5 presents a clamping means in accordance with another embodiment, the main principle of which is otherwise the same except that a balancing ring H9 is placed between the clamping members H5 and the frame H3. This balancing ring H9 can be placed in an annular space formed at the back of the clamping surfaces and the countersurfaces as seen from the pushing direction, said annular space being formed behind the shoulders, which are positioned in the inwardly radial direction in relation to of the clamping surface H12 and in the outwardly radial direction in relation to the clamping countersurface H11. FIG. 5 presents an alternative structure to the above-mentioned separate ring, in which the balancing ring 9 continues as a clamping countersurface H11 fixed to the frame, in the direction of the outermost end of the clamping means, i.e. the balancing ring 9 and the clamping countersurface H11 are located in the same annular member, which is attached to the widening at the end of the frame H3.

When moving the clamping means to the operational position, the balancing ring H9 meets the upper edge of the casing, i.e. the uppermost point of the U-fold, and makes an even fold. The ring also functions as a limiter to the clamping motion. The balancing ring H9 can be made of a hard plastic material, avoiding the noise caused by moving metal parts, or of metal.

FIG. 5 further shows a damper ring H10, which is positioned at the end of the clamping members H5, said ring remaining between the clamping members and the frame of the clamping means when the piston is pulled backwards. This ring functions as a limiter to the opening of the clamping members and is of certain suitable material, such as a hard plastic.

In front of the clamping countersurface H11 in the pushing direction there is a bevelled surface H13, which ensures that the axial edge of the container is directed into the annular space between the clamping countersurface H11 and the clamping surfaces H12.

FIG. 6 presents a situation in which the clamping jaws, formed by the clamping members H5 and the frame H3, are opened. From this figure and the structures described above it is also evident that a short motion is alone sufficient to open the jaws and, correspondingly, to close them. This means that the clamping surfaces H12 and the clamping countersurfaces H11 are at a relatively small opening angle, between 4 and 6(for example about 5) with respect to one another. In addition, the parts are dimensioned in such a way with respect to one another that when the piston is in its frontmost position, i.e. at maximum clamping, the aforementioned surfaces are at least parallel or form an opening angle against the pushing direction. If the surfaces are parallel, the both edges of the fold at the end of the can, said fold being of the same thickness from one end to the other, are pressed evenly against the clamping surface H12 and the clamping countersurface H11 in this position, this situation also being described in the magnified detail of FIG. 3. If the extreme position exceeds this position in such a way that the clamping surface H12 is directed obliquely away from the straight clamping countersurface H11, corresponding to the outer surface of the casing O, in the direction of the piston, the fold can be clamped more at the base, thus ensuring tightness especially at the point where the outermost edge of the skirt of the casing O is folded against the end member P.

Figure 7:
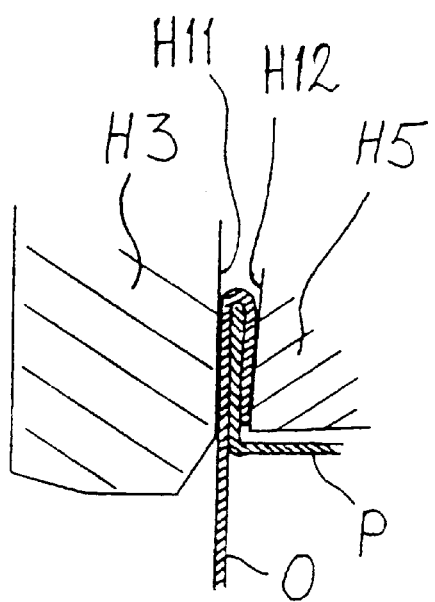
FIG. 7 shows a certain preferable clamping position.

This position is presented in FIG. 7. In the extreme position, the surfaces can also meet each other at the edges, in which case they are kept apart at the clamping stage by the material of the end member of the container in a position determined by the clamping force and the compressibility of the material.

Figure 8:
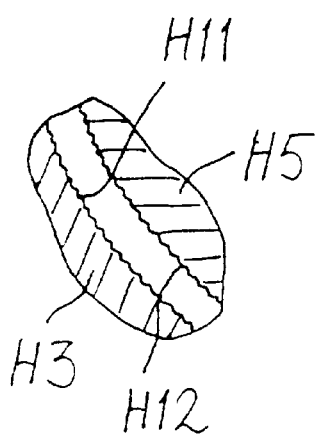
FIG. 8 shows details of the structure of the clamping surfaces.

FIG. 8 presents in more detail the section of the clamping surfaces perpendicular to the sliding axle HA. Both surfaces H11 and H12 are axially grooved in order to get a better grip, whereby the corresponding axial surfaces of the fold of the end member are slightly crimped.

As shown in FIG. 2, there can be two end sealing stations with in principle the same kind of clamping means. As separate clamping members can not clamp evenly around the entire circumference of the end seal, it is preferable to arrange the clamping members in the next end sealing station in such a way that they cover the gaps in the preceding end members on this circumference.

As the container-forming unit comprises two successive heating stations E and F, said heating stations being positioned after the pre-heating station C and the end member station D, and as the temperature of the blown air is usually at least 300° C., the heat seal coatings on the surfaces of the end member P and the casing O, said portions placed against each other, are sufficiently hot, and so the clamping surfaces of the clamping means at the end sealing stations H and I do not need to be heated, as the mechanical clamping caused by the clamping surfaces is sufficient to bring about a strong end seal. In consequence, the clamping means is of light and simple structure.

What is claimed is:

1. A container forming apparatus for pressing together an end member and a casing to join them to one another, the apparatus comprising:
    a mandrel for supporting the casing on the edge of the end member;
    clamping members pivotally mounted to pivot about a pivot axis to a clamping position to press together the end member and the casing;
    clamping surfaces on the pivotally mounted clamping members for pivoting to engage the end member;
    a frame having counter-clamping surfaces positioned opposite the clamping surfaces of the pivotally mounted clamping members to press together the casing and end member;
    a piston movable in opposite directions relative to a longitudinal direction of the casing;
    the piston having first pushing surfaces for engaging and for pivoting the clamping members in a pushing direction to pivot the clamping surfaces to press the end member against the casing;
    the piston having second pushing surfaces for pivoting clamping members to pivot the clamping surfaces away from the counter clamping surfaces on the frame when the piston is moved in an opposite direction to the first direction; and
    pivot bearing surfaces on the frame for pivotally mounting the clamping members to pivot about a pivot axis toward the clamping position and to pivot the clamping surfaces in an opposite direction away from the clamping position.

2. A container forming apparatus in accordance with claim 1 comprising:
    the first and second pushing surfaces on the piston being conically-shaped and being positioned within clamping members that surround the piston.

3. A container forming apparatus in accordance with claim 2 wherein the conically-shaped first pushing surfaces on the piston are located on one side of the pivot axis and the conically-shaped second pushing surfaces on the piston are located on an opposite side of the pivot axis.

4. A container forming apparatus in accordance with claim 1 wherein the piston moves in a downward push direction to push the clamping members to press the end member and casing together and in a vertical upward direction to push clamping members away.

5. A container forming apparatus in accordance with claim 1 wherein the pivotally mounted clamping members comprise pivotally mounted levers.

6. A container forming apparatus in accordance with claim 1 wherein the pivot bearing surfaces comprise an axle having a circular cross-section.

7. A container forming apparatus in accordance with claim 6 comprising facing curved grooves in the frame and in the clamping members forming a space into which is fitted the circular cross-section axle to pivotally mount the clamping members on the frame.

8. A container forming apparatus in accordance with claim 1 comprising:
    the piston being surrounded by the clamping members;
    first inclined counter surfaces on the clamping members inclined to the first direction and engageable with the first pushing surfaces on the piston when it travels to pivot the clamping members to press the end member and casing together; and
    second inclined counter surfaces on the clamping members inclined in a direction opposite to the first inclined surfaces and engageable with the second pushing surfaces on the piston when it travels in an opposition direction to pivot the clamping members away.

9. A container forming apparatus in accordance with claim 1 wherein the first pushing surfaces of the piston narrow to form a V-shape in the pushing direction in order to turn the clamping surfaces of the clamping members outwards towards the counter-clamping surfaces positioned on the frame.

10. A container forming apparatus according to claim 1, wherein the pivot axes of the clamping members are located before the first surfaces of the piston, which tapers into a V-shape in one direction.

11. A container forming apparatus according to claim 1, wherein the piston has a rear portion having the second surfaces tapering into a V-shape in the opposite direction to the one direction, said second surfaces being positioned against the counter-clamping surfaces, said countersurfaces approaching the pushing axis in the opposite direction to the one direction in order to turn the clamping member away from the clamping position.

12. A container forming apparatus according to claim 11, wherein the clamping surfaces of the clamping members have a curved shape perpendicular to the cross-section against the one direction and that the counter-clamping surfaces opposite them on the frame have a curved shape in the same cross-section.

13. A container forming apparatus according to claim 12, wherein a balancing ring is placed between the clamping members and the frame.

14. A container forming apparatus according to claim 13, wherein the balancing ring is of plastic material.

15. A container forming apparatus according to claim 14, wherein at the extreme position of the opposite direction to the first direction of the piston, the clamping surfaces together with the counter-clamping surfaces exert a maximum clamping pressure.

16. A container forming apparatus according to claim 15, wherein the clamping surfaces of the clamping members are unheated.

* * * * *